(12) United States Patent
Mayer et al.

(10) Patent No.: US 8,085,462 B2
(45) Date of Patent: Dec. 27, 2011

(54) SUPERPOSITION METHOD USING A PAIR OF STEREO-ISOMERIC MICRO ELECTRO MECHANICAL SYSTEMS (MEMSS)

(76) Inventors: Max Mayer, Forchheim (DE);
Bernhard Rudolf Bausenwein, Hagelstadt (DE)

(*) Notice: Subject to any disclaimer, the term of this patent is extended or adjusted under 35 U.S.C. 154(b) by 2 days.

(21) Appl. No.: 12/805,461

(22) Filed: Aug. 2, 2010

(65) Prior Publication Data
US 2010/0296170 A1    Nov. 25, 2010

Related U.S. Application Data

(63) Continuation-in-part of application No. 11/716,649, filed on Mar. 12, 2007, now abandoned, which is a continuation-in-part of application No. 11/017,916, filed on Dec. 22, 2004, now Pat. No. 7,403,320.

(30) Foreign Application Priority Data

Dec. 29, 2003    (DE) .................................. 103 61 915

(51) Int. Cl.
*G02B 26/00*    (2006.01)
(52) U.S. Cl. ......................... 359/290; 359/291; 359/292
(58) Field of Classification Search .......... 359/290–292, 359/298, 283, 242, 251, 267, 618, 629, 639, 359/640

See application file for complete search history.

(56) References Cited

U.S. PATENT DOCUMENTS

| | | | |
|---|---|---|---|
| 4,647,966 A * | 3/1987 | Phillips et al. ................. | 348/58 |
| 5,600,383 A | 2/1997 | Hornbeck | |
| 5,638,142 A | 6/1997 | Kavanagh et al. | |
| 5,982,541 A * | 11/1999 | Li et al. ......................... | 359/242 |
| 6,250,763 B1 | 6/2001 | Fielding et al. | |
| 6,276,801 B1 | 8/2001 | Fielding | |
| 6,631,993 B2 | 10/2003 | Fielding | |
| 7,396,132 B2 | 7/2008 | Vandorpe et al. | |

FOREIGN PATENT DOCUMENTS

| | | |
|---|---|---|
| DE | 103 61 915 | 12/2003 |
| GB | 2 291 978 | 9/1994 |

* cited by examiner

*Primary Examiner* — Ricky Mack
*Assistant Examiner* — Brandi Thomas

(57) ABSTRACT

DMDs (digital mirror devices) as currently produced by Texas Instruments show handedness with regard to mirror deflection axes and image raster. At present only one isomer (one hand-type) is produced, which we call the (L)DMD. For the superposition of (L)DMDs an additional folding is required in all arrangements of the state of the art, which results in sophisticated and expensive designs, e.g. the trichroic prism assembly (TPA) of 3-chip DMD-projectors. We uncover a superposition method using a pair of stereo-isomeric MEMSs (both the right-handed and the left-handed stereo-isomeric topologies are used). This eliminates the necessity of this previously required additional folding. As a consequence simplified and improved superposition systems can be designed. Minimal back focal length and symmetric designs lead to smaller size, lighter weight and reduced cost.

14 Claims, 15 Drawing Sheets

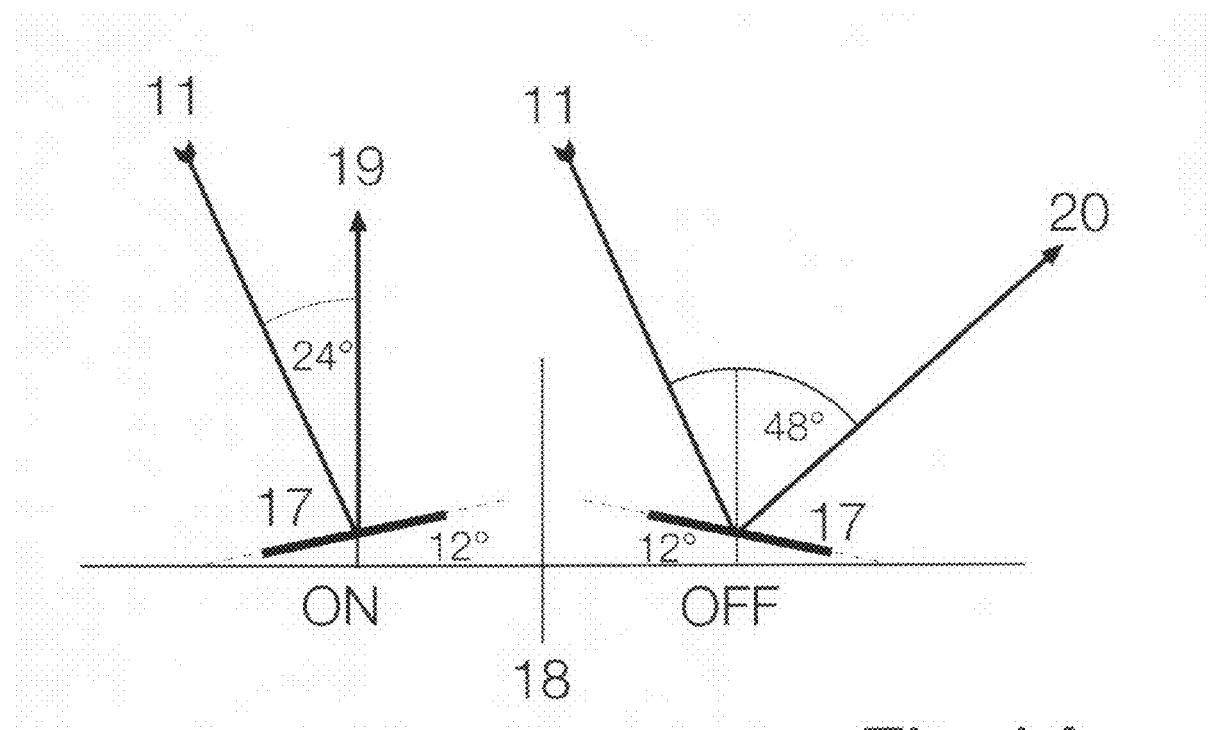
state of the art  Fig.1A
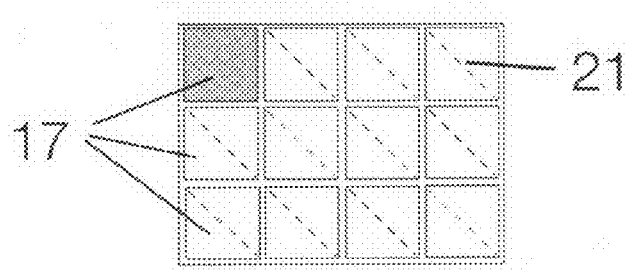
state of the art  Fig.1B

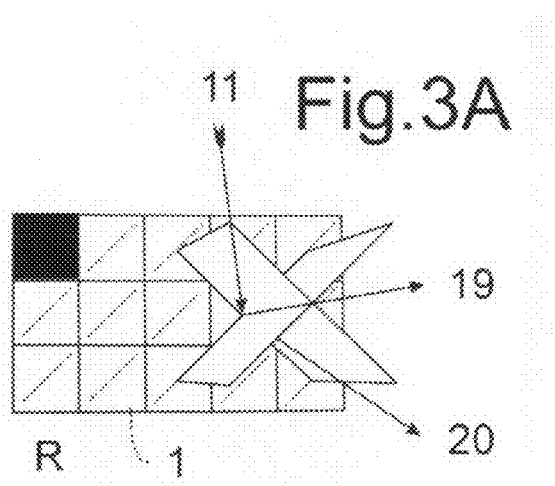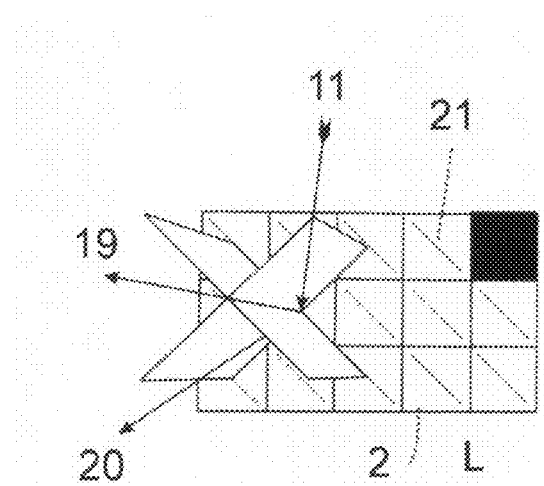
Fig.3A
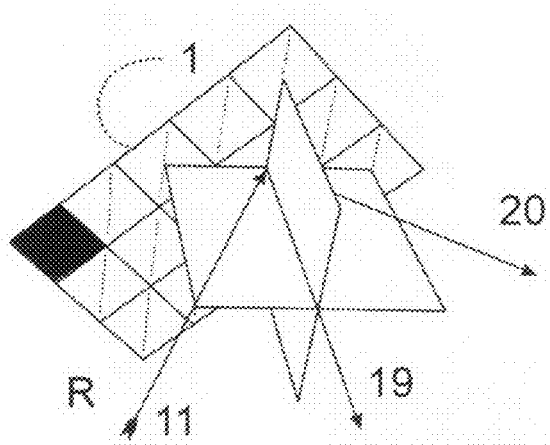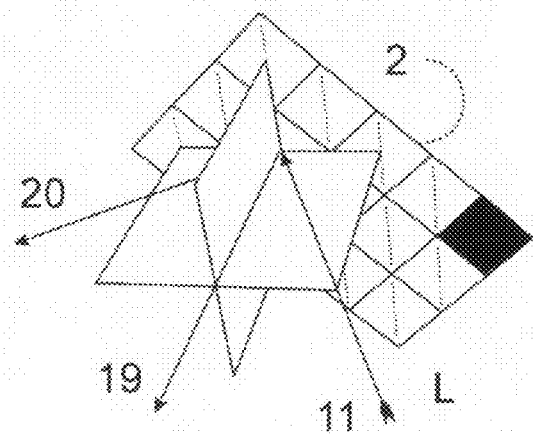
Fig.3B
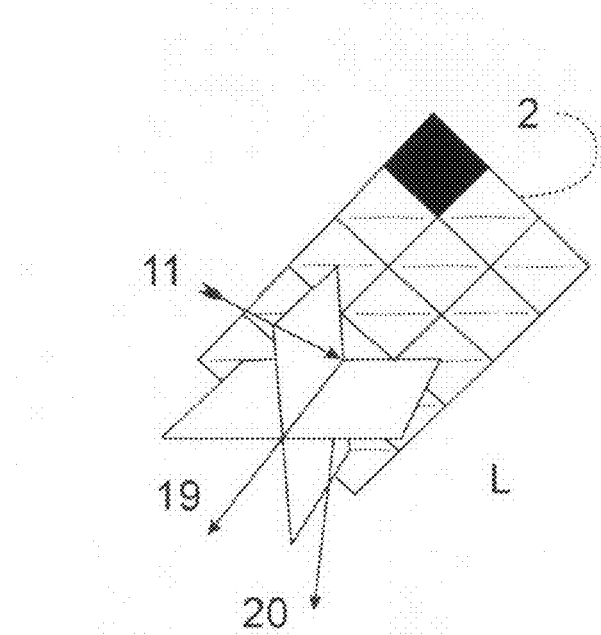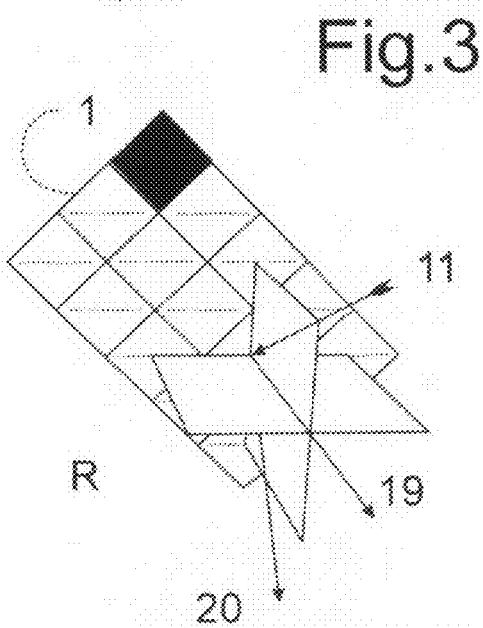
Fig.3C

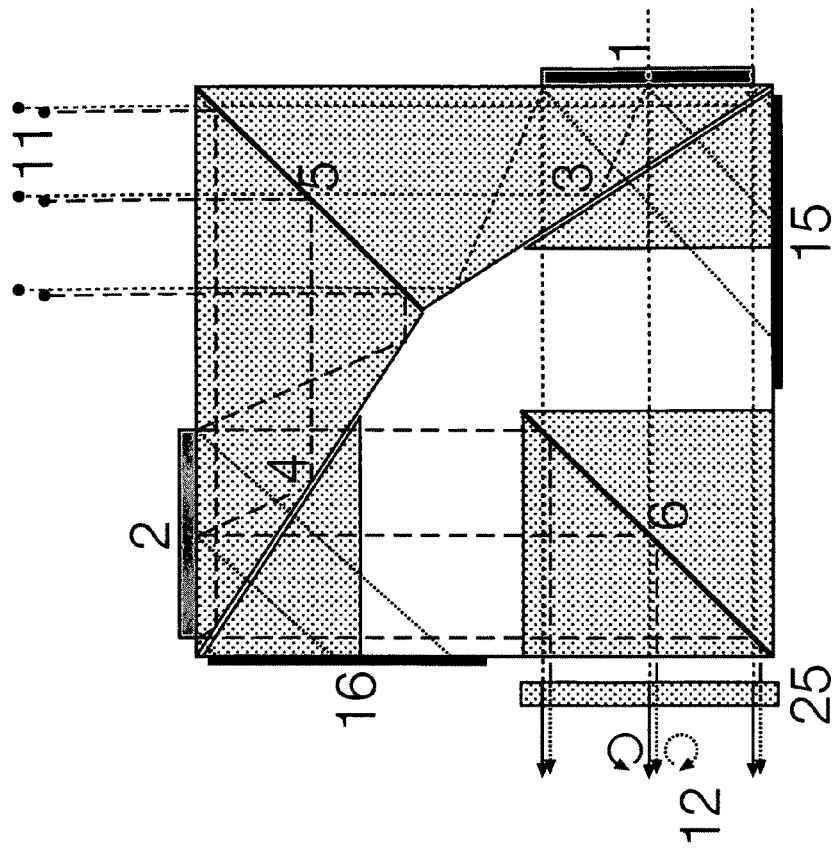
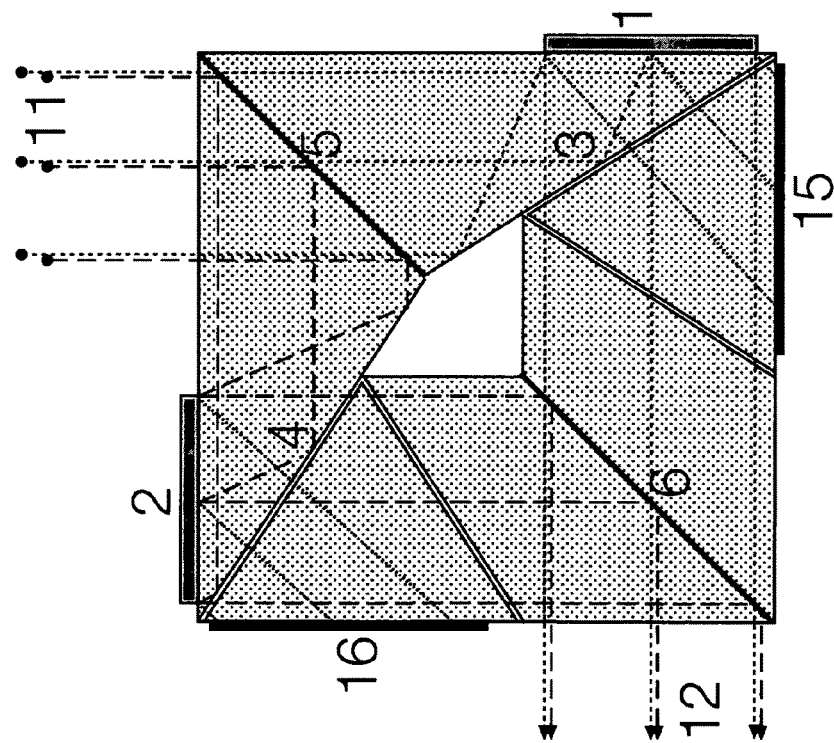

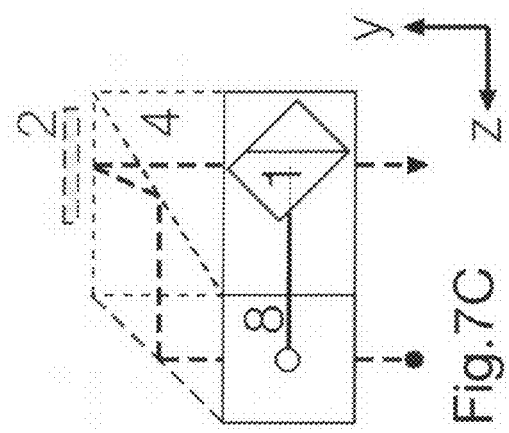
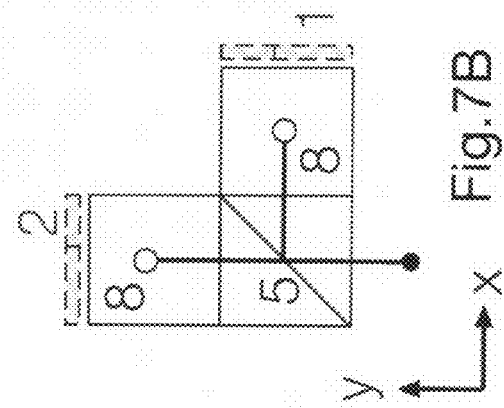
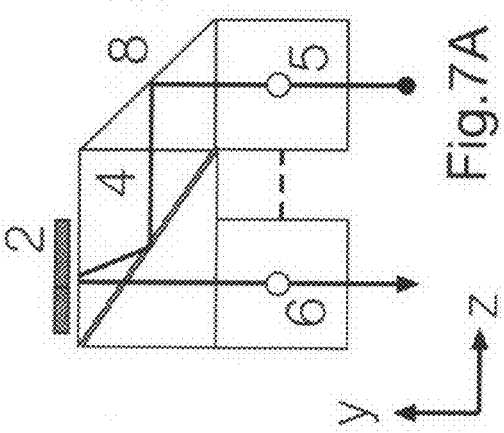
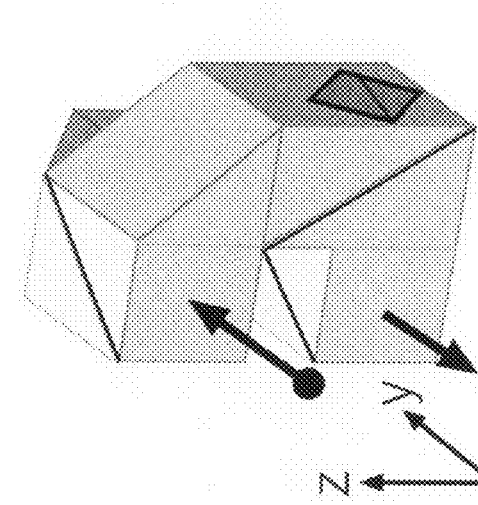
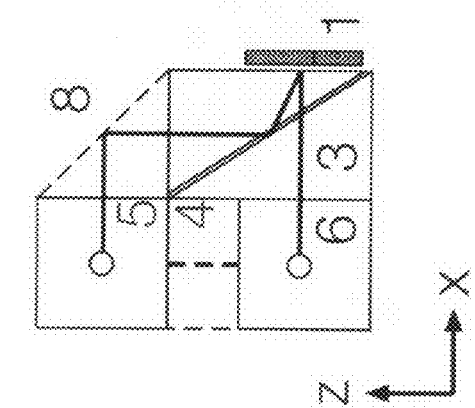
Fig.7A  Fig.7B  Fig.7C
Fig.7D  Fig.7E  Fig.7F

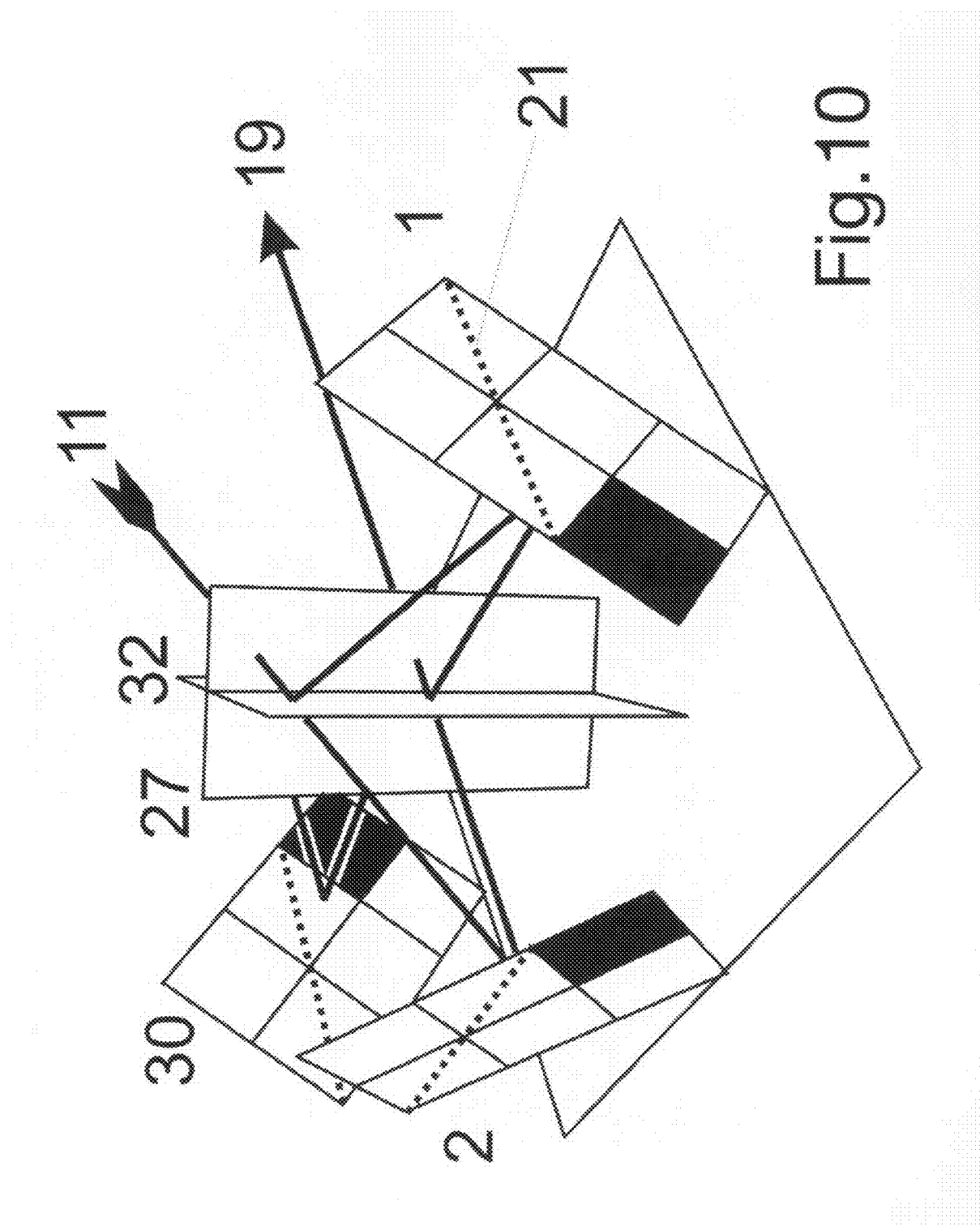

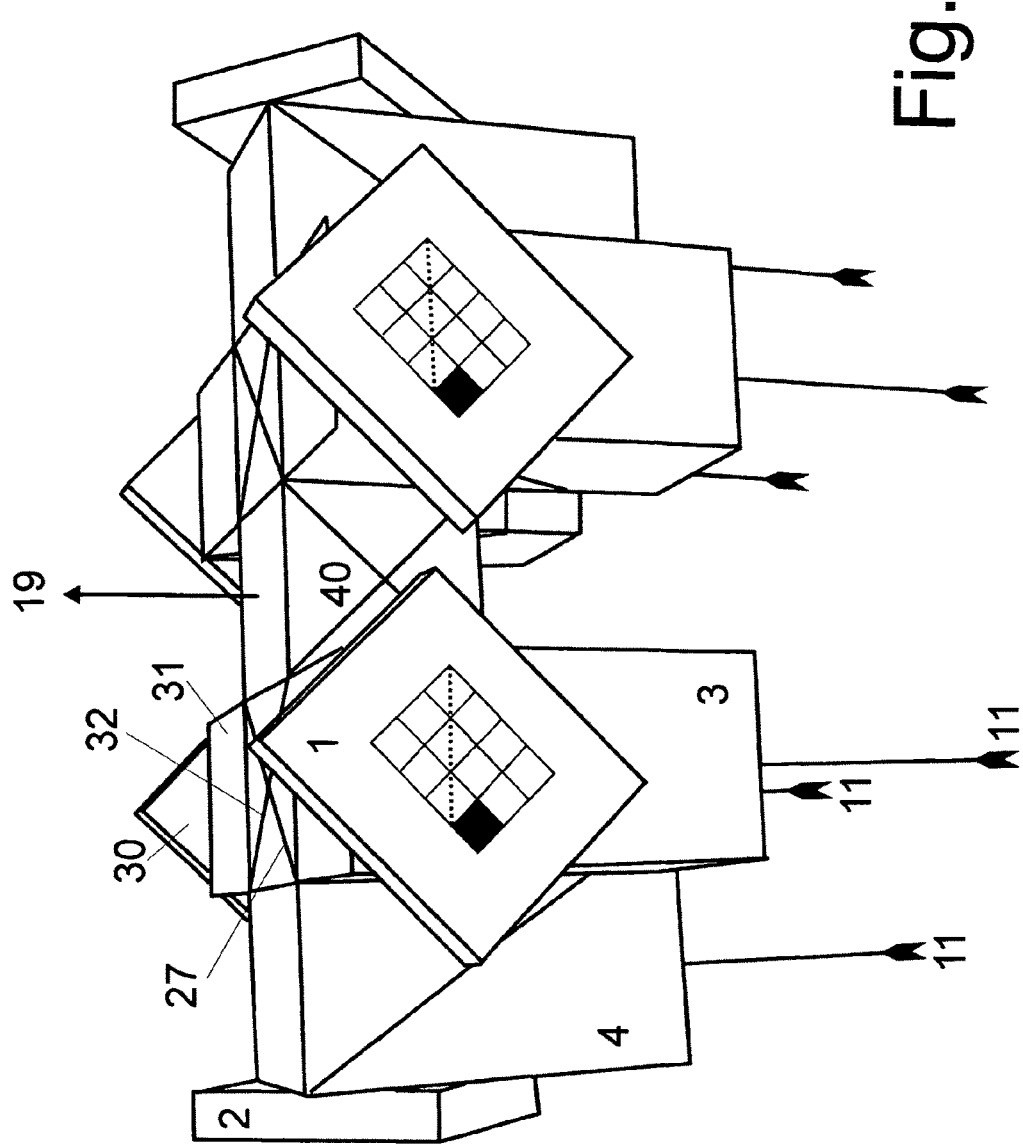

US 8,085,462 B2

SUPERPOSITION METHOD USING A PAIR OF STEREO-ISOMERIC MICRO ELECTRO MECHANICAL SYSTEMS (MEMSS)

RELATED APPLICATION

This application is a continuation in part of application U.S. Ser. No. 11/716,649 filed Mar. 12, 2007 now abandoned entitled "Superposition system comprising micro electro mechanical systems" which is a continuation in part of application U.S. Ser. No. 11/017,916 entitled "2-Channel display system comprising micro electro mechanical systems" filed on Dec. 22, 2004, now U.S. Pat. No. 7,403,320 which claims the benefit from the priority of German Patent DE 103 61 915 filed on Dec. 29, 2003, the disclosure of which is incorporated by reference herein in its entirety.

CROSS-REFERENCE TO RELATED APPLICATIONS

U.S. Pat. Nos. 7,403,320 and 7,466,473 and U.S. application Ser. No. 12/000,467 entitled "2-Channel Display System Comprising Micro Electro Mechanical Systems" and U.S. application Ser. No. 11/716,649 entitled "Superposition System Comprising Micro Electro Mechanical Systems".

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention relates to display and projection systems using multiple micro electro mechanical systems (MEMS) as spatial light modulators (SLMs). More specifically the invention overcomes restrictions in the design of superposition systems rooted in the chirality (handedness) of MEMSs (e.g. digital mirror devices (DMD) from Texas Instruments) according to the state of the art. More specifically the present invention uncovers a superposition method using a pair of stereo-isomeric MEMSs (right-handed and left-handed stereo-isomeric topologies).

All display systems which use more than one SLM (e.g. standard 3-chip systems for simultaneous RGB color generation or true parallel 2-chip stereo projection devices generating left and right eye information simultaneously) have to use at least one superposition layer. The spatially modulated ON-light of one SLM transmits this layer and the ON-light of a second SLM is reflected at this layer which thus combines both ON-lights into a common optical path.

A single reflection always means that the image is transformed to its mirror image. Thus one of the two ON-beams which have to be superposed has to carry this image information mirror-symmetrically with respect to the other. In general this can easily be realized by electronically transforming the respective image information. E.g. in reflective liquid crystal on silicon (LCOS) modulator systems, the spatial light modulation is controlled by the polarization state of the light whereby ON-beams and OFF-beams have the opposite polarization. Both beams are oriented normal to the chip surface. LCOS (and LCD) modulators therefore have a symmetry axis with respect to their overall performance. Obviously, MEMSs can also be addressed mirror symmetrically. However, in DMD displays the spatial light modulation is controlled by the direction of the light beams. This requires more sophistication in the light guidance, as both the IN-light and OFF-light are not normal to the surface of the modulator; only the optical ON-axis is normal to the chip surface (compare FIG. 3A).

In addition, MEMSs of the state of the art (e.g. DMDs by Texas Instruments U.S. Pat. No. 5,600,383) do not show any axes of symmetry considering their overall operation. Only the "ON" beam is reflected perpendicularly to the modulator surface. The incident beam, however, is perpendicular to the mirror deflection axis (the deflection axis is normal to the plane of incidence), which is rotated by 45° to the image raster. On the other hand, the incidence angle is twice the deflection angle of a single mirror (e.g. 24°) (See FIG. 1A). This asymmetric overall performance has profound impact on system designs for multiple imagers.

A DMD with a 4×3 matrix is shown in FIG. 1B (the modulator is shown as an example of a landscape format oriented rectangular array of modulator elements with w columns and h rows; this corresponds to a usual width/height ratio and orientation of current DMD modulators). Single mirrors (17) rotate around a deflection axis which has an angle of 45° relative to the raster image. In FIG. 1B the single mirror deflection axes (21) are visible after "removing" the mirrors. The DMD corresponds to the topological type built by Texas Instruments (U.S. Pat. No. 5,600,383) according to the state of the art. While the rectangular raster image itself shows internal symmetry, the DMD is not a symmetrical structure because the orientation of the mirror deflection axis has to be taken into account. For overall operation no internal symmetry exists. Not by rotation, but only by a reflection the currently produced "L"-topology is "converted" into a "R"-topology (compare FIG. 3A-C). Due to their rectangular shape and to the orientation of the mirror deflection axes, which are rotated 45° to the image raster, MEMS of the state of the art show stereo-isomery (chirality, handedness). Handedness is characterized by the existence of two different topologies which are mirror symmetric and cannot be transformed into each other by rotation. The lack of a right-handed (R)DMD has profound impact on multiple chip design.

In all 2-chip or 3-chip DMD projection devices according to the state of the art the L(DMD) modulators are positioned such that their modulator element arrays are inclined by 45° relative to the plane of incidence (POI) of the superposition layer (see FIGS. 2, 9). In general, the mirror deflection axes are oriented parallel to the POI, which facilitates light guidance to and fro the modulators, with the IN- and OFF-lights being in a plane different from the POI of superposition (compare FIGS. 2, 9 wherein all IN-light is directed from below the superposition POI and all OFF-light is directed to a common dump above this plane). This design also allows for a common split- and combine system where the dichroic layers are used both to feed the DMDs with color-split light and to superpose the spatially modulated ON-light of the three DMDs into a common ON-beam.

However, such a rotated positioning of the DMDs requires additional actions for a successful superposition. While the shape of the ON-light of one DMD, which transmits the superposition layer remains unchanged, the shape of the ON-light of a second DMD which is reflected at the superposition layer is transformed to its mirror-image; this would result in a mismatch of the superposition (cause incomplete overlap; e.g. Bausenwein and Mayer U.S. application Ser. No. 11/716, 649). Therefore, two principle ways to correct this are known to the state of the art: either the use of an additional reflecting surface for the transmitting ON-beams (equalizing the number of reflections (comp. Kavanagh and Fielding U.S. Pat. No. 5,638,142 entitled: "spatial light modulator system including a plurality of tiltable mirror devices and reflective means for equalizing the number of reflections from the tiltable mirror devices"; Fielding et al., U.S. Pat. No. 6,250,763 FIG. 3; Fielding U.S. Pat. Nos. 6,276,801; 6,631,993; Fielding GB 2 291 978) or the use of an additional reflecting surface for the reflecting ON-beams, which makes the difference of the number of reflections of the two superposed ON-beams an even number (in general, this difference equals 2); e.g. Fielding U.S. Pat. No. 6,250,763 page 7 line 31: "It will be appreciated that as the red and blue spatially modulated light undergoes two reflections prior to being recombined to form the output white spatially modulated light beam, it is not necessary to provide a further reflector in the green light path as shown in FIG. 3").

In trichroic prism assemblies (TPA) according to the state of the art (FIG. 9) the IN- and ON-beams of the red and blue DMDs are reflected twice; whereas the IN- and ON-light of the green DMD transmits the superposition layer (see FIG. 9; prior art in U.S. Pat. No. 7,396,132). We have uncovered that the need for adjusting the number of reflections when using at least two (L)DMDs can be resolved; however this is achieved at the cost of increased complexity in the light guidance system (Bausenwein and Mayer U.S. Pat. No. 7,466,473). The use of a stereo-isomeric pair of an (L)DMD and its isomeric counterpart (R)DMD would allow for a liberated and simplified system design. Without having to adjust the number of reflections, the design of multi-DMD superposition arrangements benefits from facilitations of light guidance. This is what we uncover in our new superposition method.

BRIEF SUMMARY OF THE INVENTION

DMDs (digital mirror devices; Texas Instruments; e.g. Hornbeck, U.S. Pat. No. 5,600,383) according to the state of the art show handedness (cit. above, FIG. 4) with regard to mirror deflection axes and image raster. At present only the left-handed (L)DMD is produced. The lack of a right-handed (R)DMD has an profound impact on multiple chip designs (e.g. for simultaneous RGB color generation or true parallel stereo projection) resulting in quite sophisticated (and expensive) light guiding arrangements (e.g. trichroic prism assembly (TPA), e.g. Fielding U.S. Pat. No. 6,250,763; or total internal reflection prism (TIR) arrangements of Bausenwein and Mayer U.S. Pat. No. 7,466,473). The present invention uncovers a superposition method using a pair of stereo-isomeric MEMSs (right-handed and left-handed stereo-isomeric topologies). As a consequence multiple chip design can be liberated and simplified (e.g. reduce back focal length and work with symmetric solutions).

The fact that in DMD displays the spatial light modulation is controlled by the direction of the light beams together with the mirror deflection axes oriented 45° to the imager raster requires some sophisticated light guiding with IN-light and OFF-light not normal to the chip surface and only the optical ON-axis being normal to the chip surface. FIG. 3A shows a pair of stereo-isomeric MEMSs in their overall performance. The modulator array depicted on the right side in FIG. 3A, the (R)DMD which is the mirror image of the (L)DMD, is a materially different structure than the (L)DMD.

The most obvious way to produce this counterpart is to produce everything in a mirror-image topology. However, it is also known from our application U.S. Ser. No. 11/716,649, that as a consequence of the 45° rotation of the MDAs there is another way to generate a matching stereo-isomeric counterpart of a (L)DMD with an modulator array of B (width)×M (height); this is the production of a (L)DMD with reversed array sizes (imagine a portrait-format oriented (L)DMD with M (width) and B (height)). This leads to a functional equivalent of the (R)DMD according to our invention (see U.S. application Ser. No. 11/716,649 for a detailed description of the addressing scheme and rotations).

When the pair of MEMSs is put in parallel like in FIG. 3A, the different directions of IN and OFF lights needed to operate the MEMSs make it hard to see why we introduced them for a improved superposition scheme. However, the advantages become obvious when we rotate the MEMSs by 45° for superposition systems. FIGS. 3B and 3C show settings with both (R)MEMS and (L)MEMS oriented to have their mirror deflection axes (MDA) parallel. The vertical orientation of the MDAs (the planes of incidence [POIs] of the MEMS being horizontal planes) allows for symmetrical display design as shown in FIGS. 4 and 5. The horizontal orientation of the MDA (the POIs being vertical planes) allows for a common split and combine system with the input light incident from below (or above), the OFF-light collected above (resp. below) a common horizontal superposition POI (see FIGS. 6-8, 10-12).

FIGS. 4-8, 10-12 demonstrate the benefits of our superposition method using a pair of stereo-isomeric MEMSs with an odd numbered difference of the number of reflections in their superposed ON-beams, wherein this difference preferably equals 1. Our superposition scheme without corrective reflection leads to simpler system designs with a smaller engine assembly which is lighter, less expensive and which can provide a much shorter back focal wavelength for the optical systems downstream the modulators.

BRIEF DESCRIPTION OF THE SEVERAL VIEWS OF THE DRAWING

FIG. 1A is a schematic diagram illustrating the operation of a MEMS (DMD) according to the state of the art.

FIG. 1B shows schematically the stereo-isomeric topology of MEMS according to the state of the art ((L)DMD).

FIG. 3A shows a pair of left- and right-handed MEMSs in their overall performance.

FIG. 3B shows a pair of handed MEMSs in their overall performance with vertically oriented mirror deflection axes (MDAs).

FIG. 3C shows a pair of handed MEMSs in their overall performance with horizontally oriented MDAs.

FIG. 5 shows a 2-DMD superposition system according to our method.

FIG. 7 shows a 2-DMD superposition system according to our method.

FIG. 10 shows a 3-DMD superposition system according to our method.

FIG. 12 shows a 6-DMD superposition system according to our method.

DETAILED DESCRIPTION OF THE INVENTION

Figure 2:
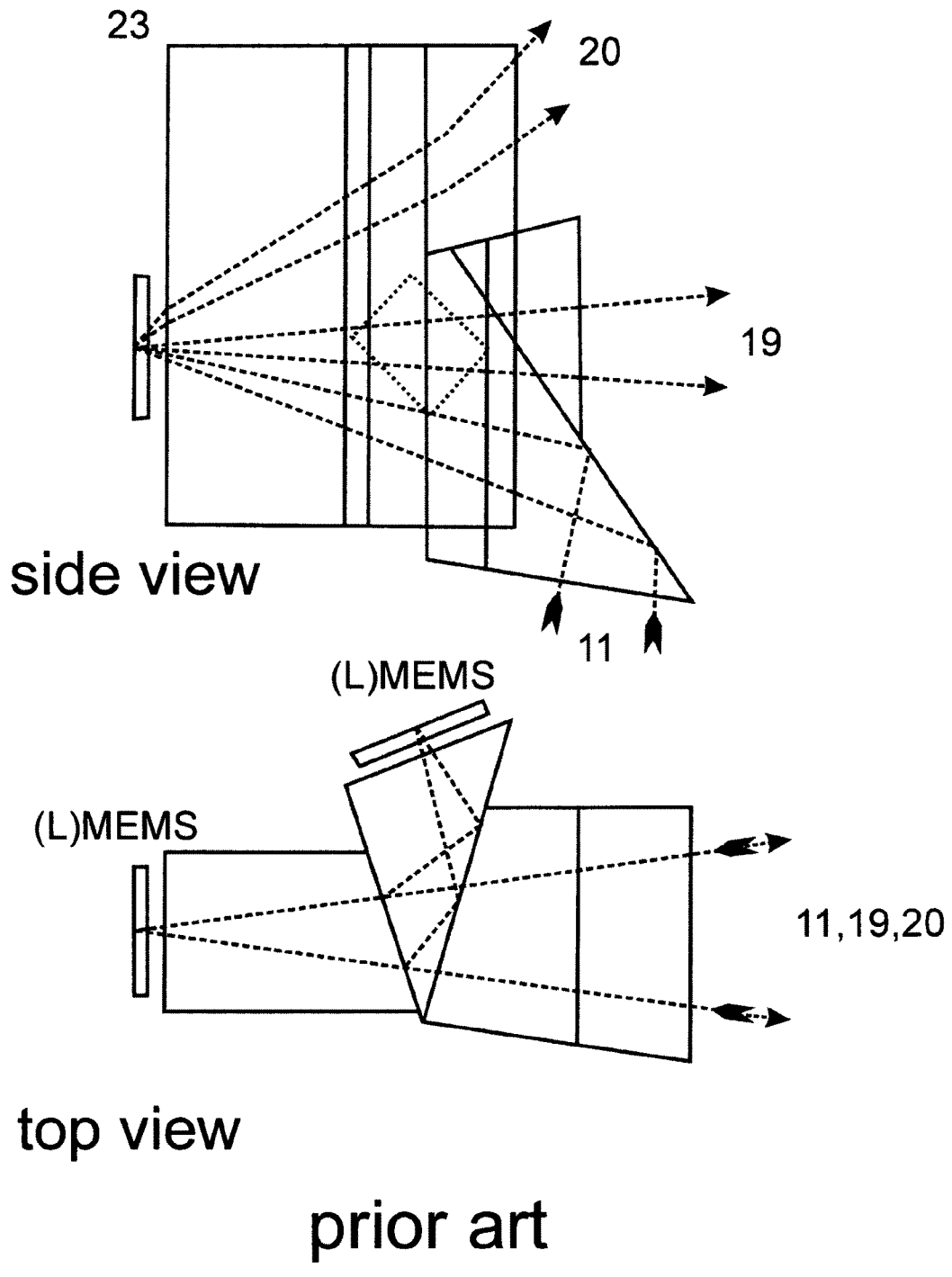
FIG. 2 shows a 2-DMD superposition system according to the state of the art (a dichroic prism assembly).

For the sake of simplicity all following figures are labeled such that identical numbers in different figures indicate identical components. MEMS 1 (1); MEMS 2 (2); TIR 1 (3); TIR 2 (4); PBS 1 (5); PBS 2 (6); WGP (7); deflection mirror or TIR (8); cleanup polarizer for "S"-light (9); cleanup polarizer for "P"-light (10); incident beam (11); superimposed "On"-beam (12); channel 1 (13); channel 2 (14); dump: "Off-light" channel 1 (15); dump: "Off-light" channel 2 (16); single deflectable mirror (17); normal (18); "On"-beam (19); "Off"-beam (20); mirror deflection axis (21); superposed image (22); trichroic prism assembly (TPA) for color separation/color recombination in channel 1 (23); TPA in channel 2 (24); polarization conversion system PCS (25); plane of incidence of the polarizing beam splitter ($P_{POI}$, 26); split/superposition layer 1 (27); MEMS 3 (30); TIR 3 (31); split/superposition layer 2 (32); XPoI (cross polarizer of application U.S. Ser. No. 10/587,850) (40). In FIGS. 6 and 7 a small circle marks positions where a light beam is deflected in a direction perpendicular to the drawing plane.

FIGS. 3A-C show pairs of stereo-isomeric MEMSs in their overall performance. The (R) type introduced here can be thought of a mirror image of the existing (L)topology. It could also be generated by a potentially simpler approach (see above and U.S. Ser. No. 11/716,649). While the complex geometry of the parallel horizontal pair shown in FIG. 3A (considering the IN-, ON-, and OFF-beam directions) does not lead to a direct impression of an advantage of using this pair, after rotations of the MEMSs by 45 degrees (FIG. 3B, C) the advantages for superposition systems become evident.

FIGS. 3B and 3C show two possible settings where both MEMSs are oriented to have parallel mirror deflection axes (MDA). In FIG. 3B the (L)MEMS is rotated by −45°, the (R)MEMS by +45 degrees with respect to the landscape orientation shown in FIG. 3A. In FIG. 3C the (L)MEMS is rotated by +45°, the (R)MEMS by −45° with respect to the landscape orientation shown in FIG. 3A. The vertical direction of the MDAs shown in FIG. 3B leads to horizontal planes of incidence (POIs) of the MEMSs. This orientation is used in the symmetrical modulator designs shown in FIGS. 4 and 5. The horizontal direction of the MDAs shown in FIG. 3C, where the POIs are vertically oriented, is used in superposition designs with a common split and combine system. Here the input light is incident either from below or above the common superposition POI, the off-light is collected above or below this plane (see FIGS. 6-8, 10-12).

FIGS. 4-8 and FIGS. 10-12 demonstrate the benefits of our superposition method using a pair of stereo-isomeric MEMSs in display systems. In the preferred arrangement no additional reflective surface has to be added to the single superposition reflection surface. The difference in the number of reflections in the two superposed beams is neither equal 0 nor an even number as required by previous art which was then achieved by using additional reflections; in our method, this difference is an odd number, preferentially 1 with no additional reflections besides the superposition. The total number of reflections is minimized by our approach; this leads to the smaller, lighter, less expensive system designs with improved (shortened) optical paths.

Figure 4:
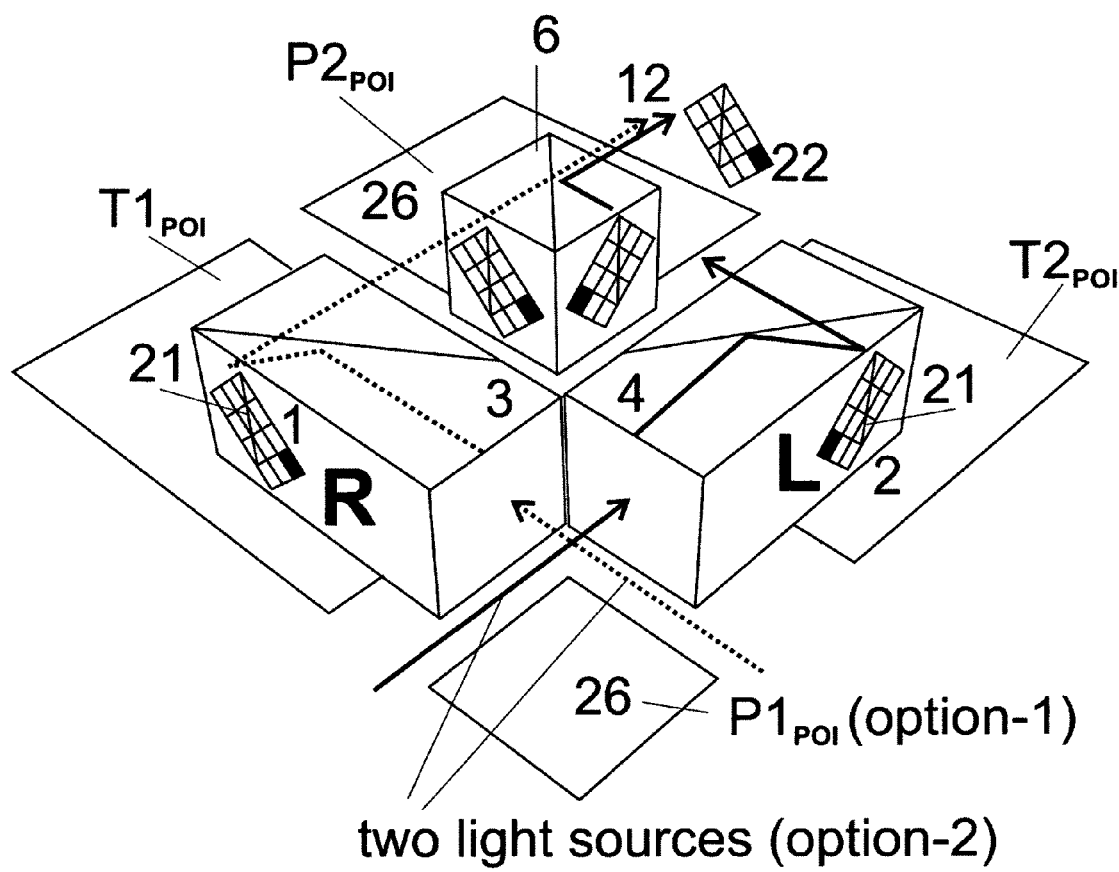
FIG. 4 shows a 2-DMD superposition system according to our method.
Figure 6A:
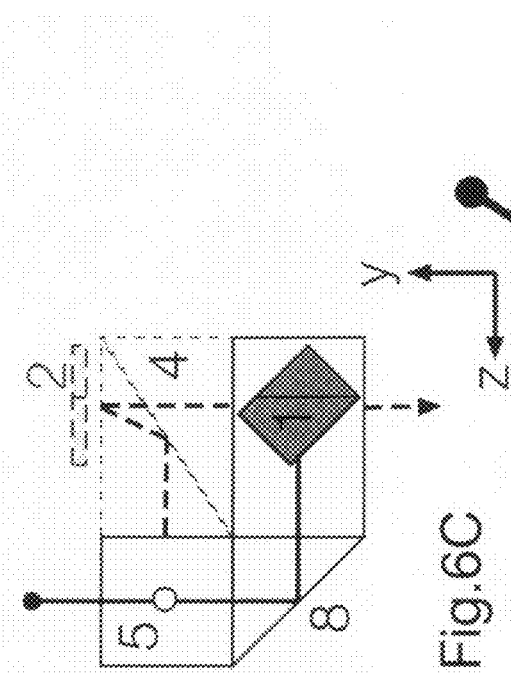
FIG. 6 shows a 2-DMD superposition system according to our method.
Figure 6B:
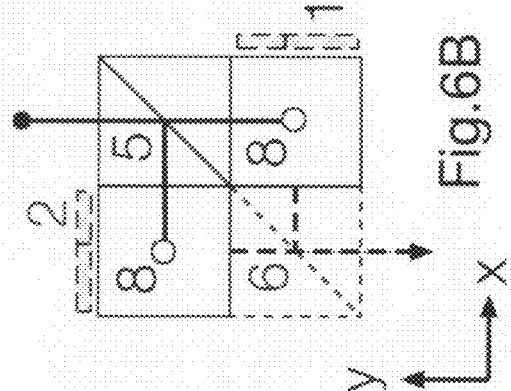
Figure 6D:
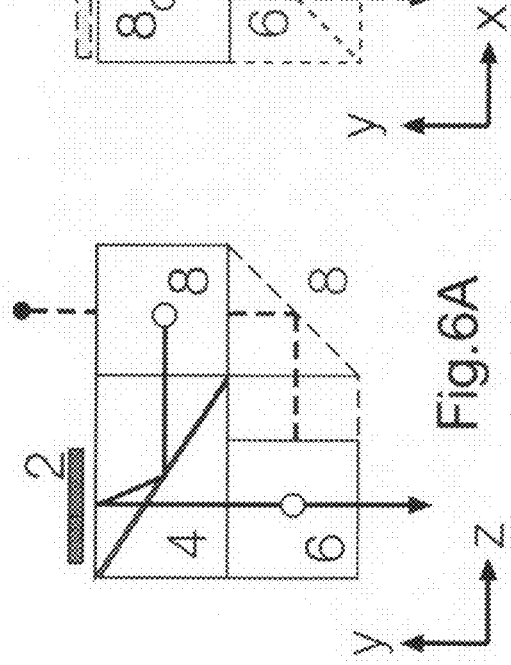
Figure 6C:
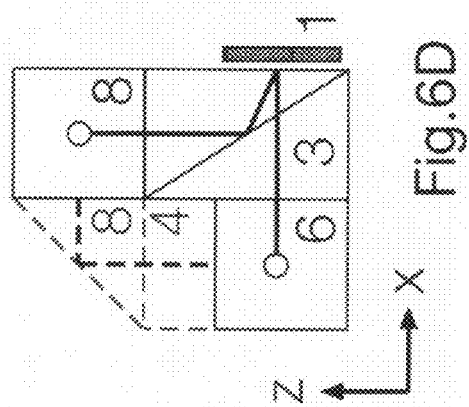
Figure 6E:
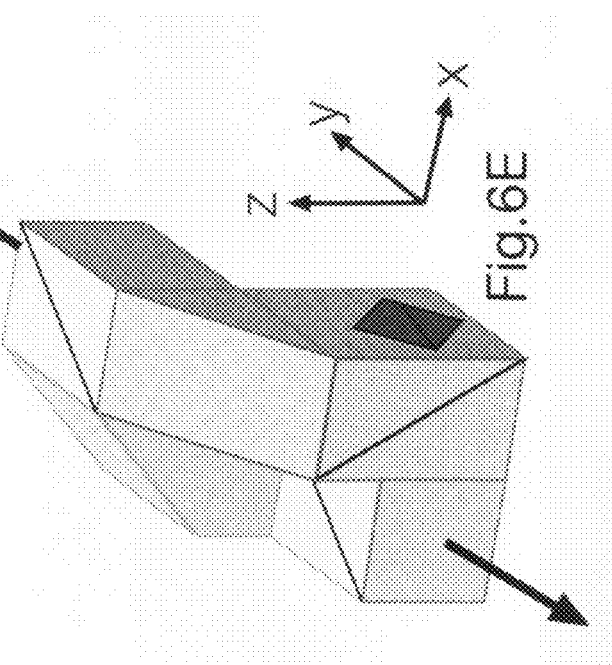
Figure 8A:
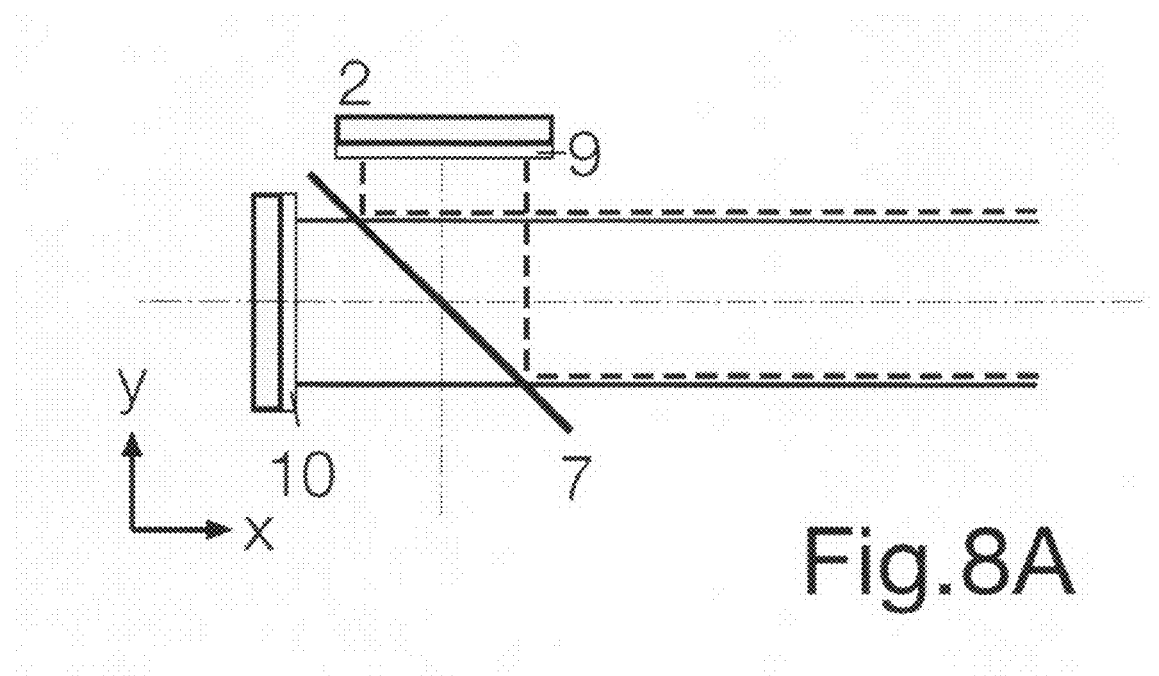
FIG. 8A shows a 2-DMD superposition system according to our method.
Figure 8B:
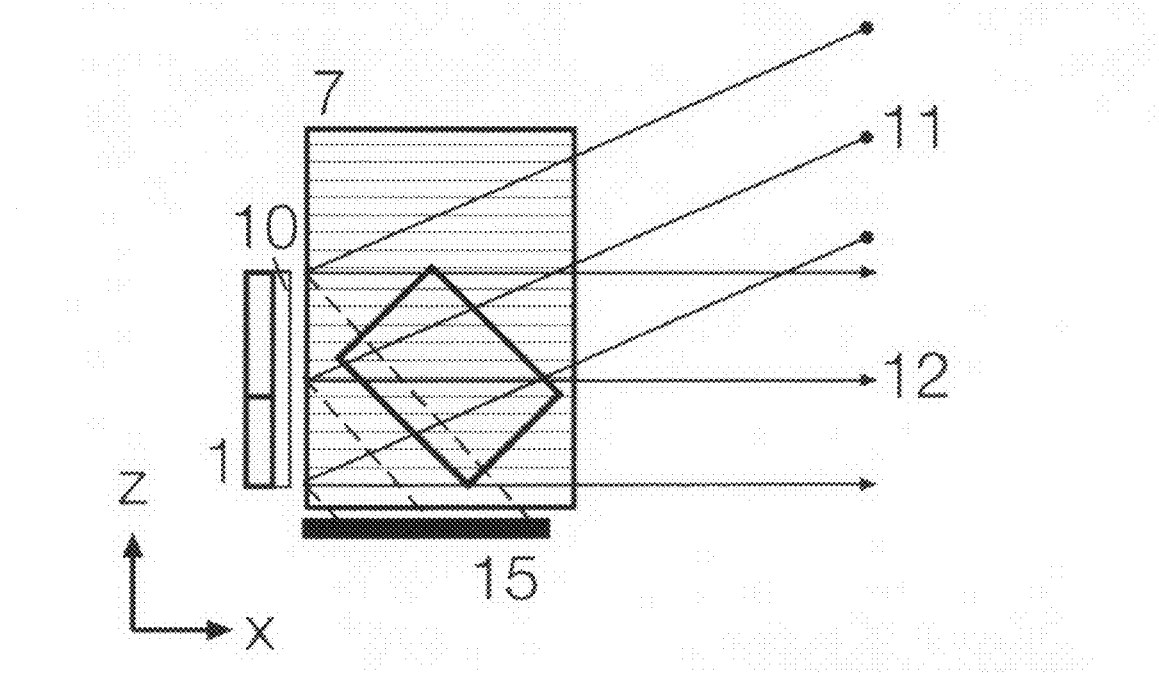
FIG. 8B shows a 2-DMD superposition system according to our method.
Figure 8C:
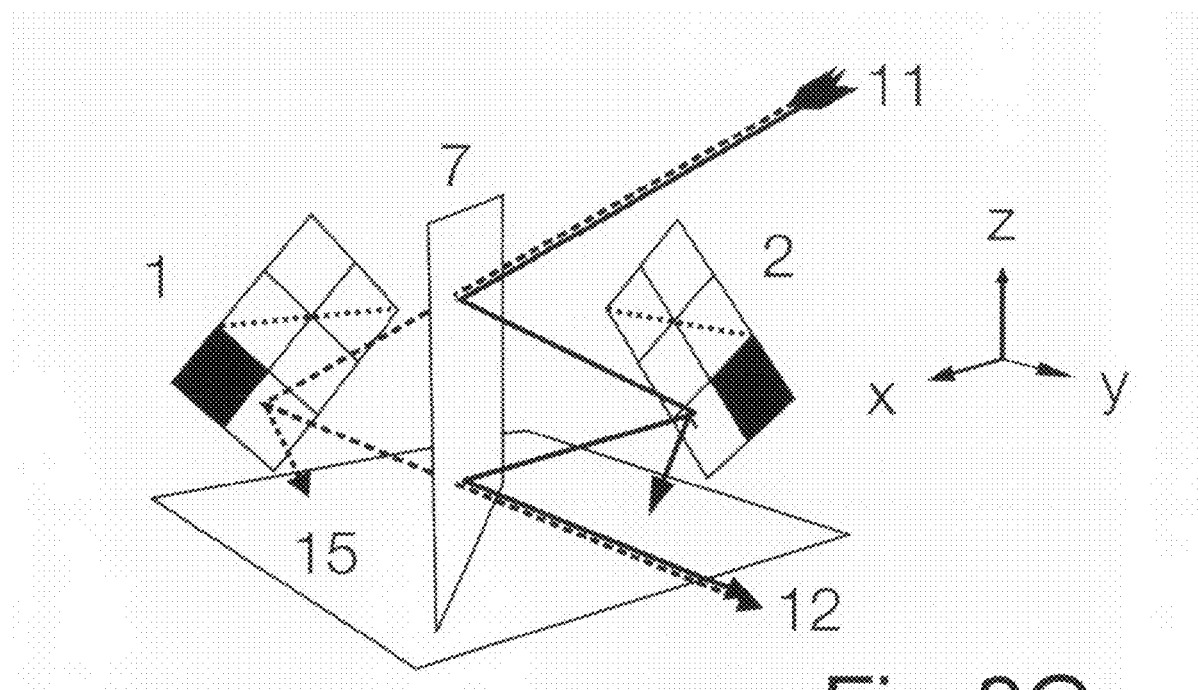
FIG. 8C shows a 2-DMD superposition system according to our method.
Figure 8D:
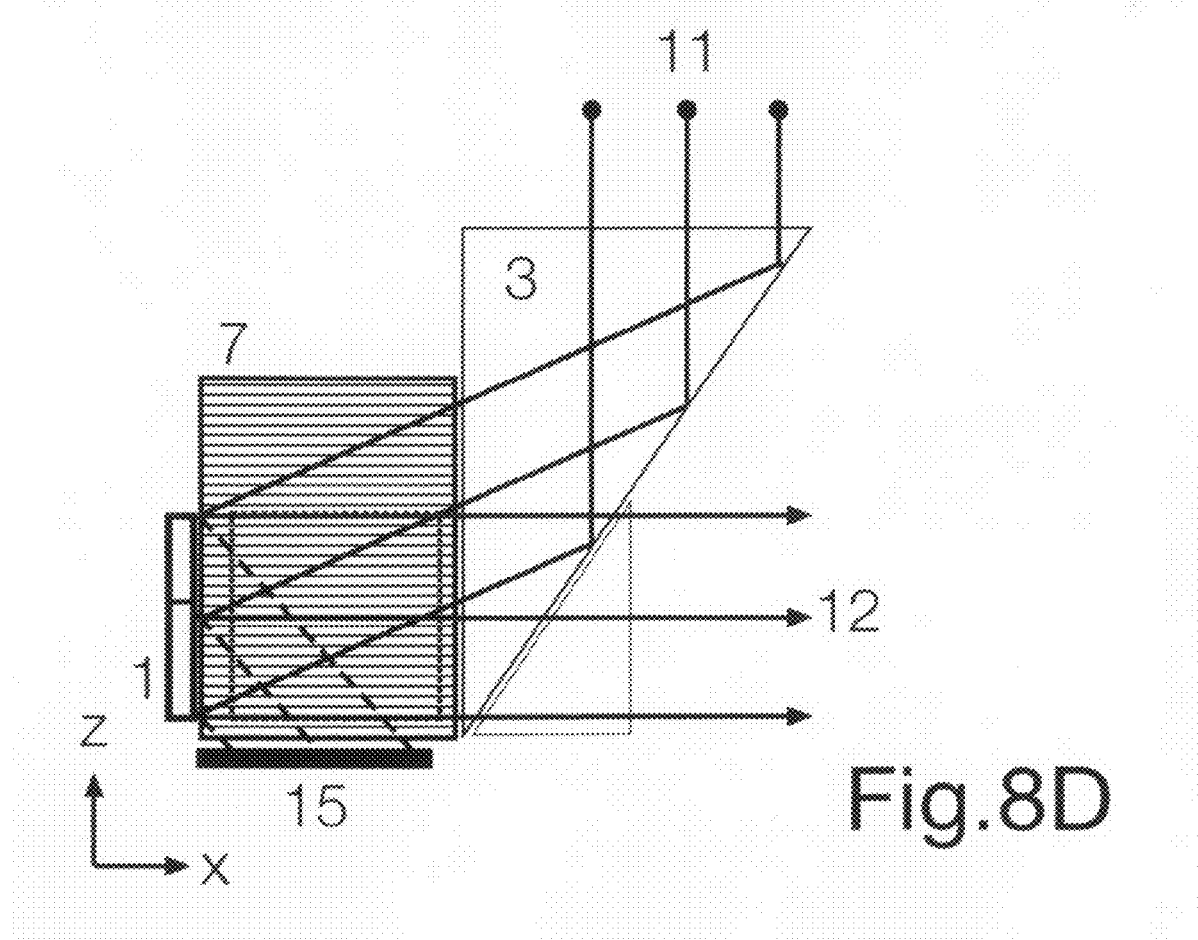
FIG. 8D shows a 2-DMD superposition system according to our method.
Figure 8E:
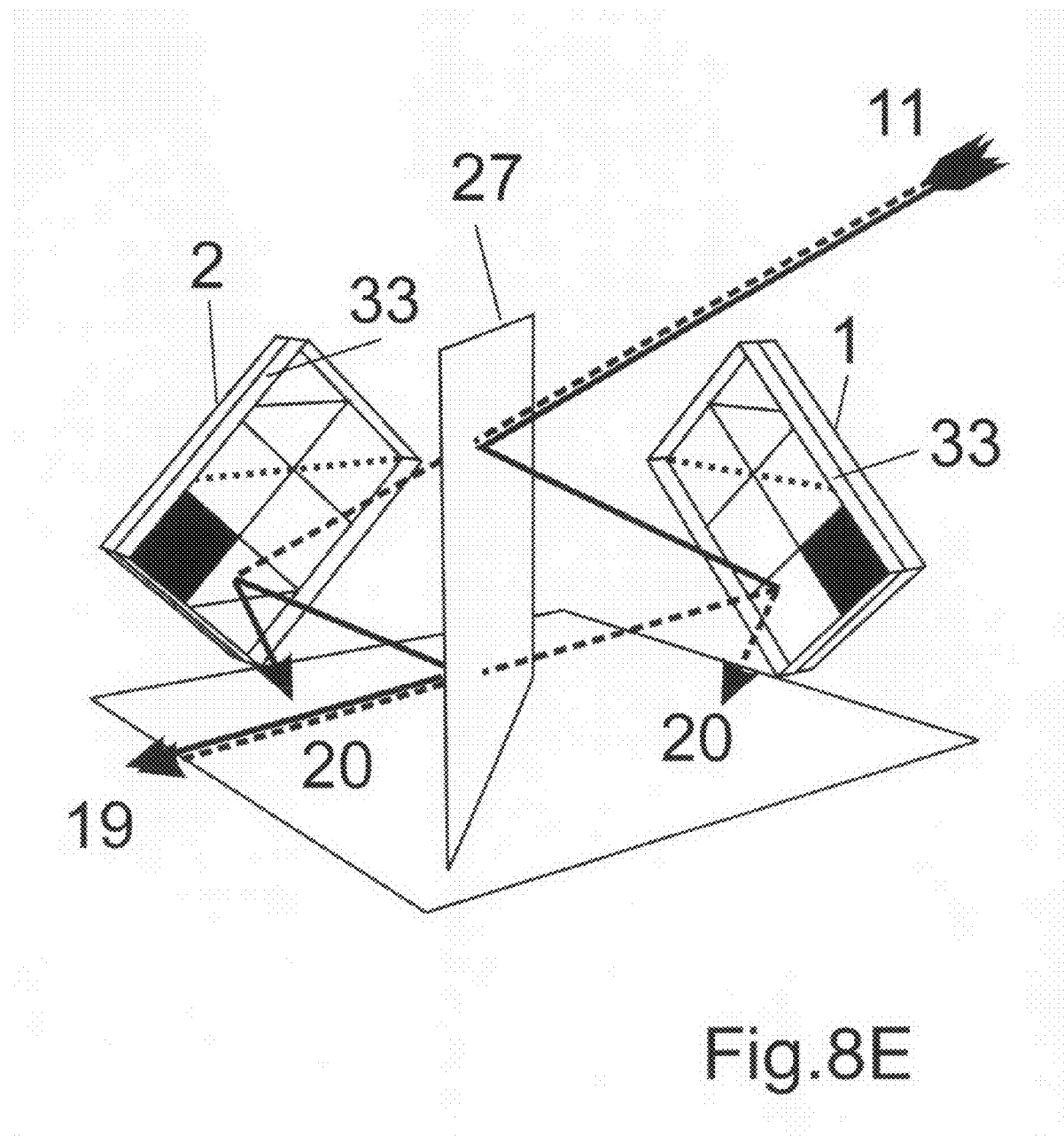
FIG. 8E shows a 2-DMD superposition system according to our method.

FIG. 4 shows a first embodiment based on our superposition method in a 2-channel polarization-coded system. By using R- and L-MEMS a mirror-symmetric, efficient light path and a complete superposition of the two images with a polarization combining system becomes possible. MEMS (2) is of the available DMD topology ("L" type of FIG. 1B). MEMS (1) is the stereo-isomeric counterpart of 2 ("R" type). Light paths in both channels are directed such that the planes of incidence ($T1_{POI}$, $T2_{POI}$) formed by the incident and reflected beams of the TIRs are parallel to the plane of incidence (26, $P2_{POI}$) formed by the incident and reflected beams of the PBS (6). The superposed image (22) shows that the virtually projected mirror deflection axes (21) of the two MEMSs (1 and 2) are parallel and that a complete overlap of the two corresponding images is possible. The design suggests to use a PBS for splitting the light into orthogonal polarizations with planes of polarization parallel in on channel and perpendicular in the other channel to the MEMSs POIs (resp. TIR POIs). This is a preferred processing of linearly polarized light which prevents the linearly polarized light from being degraded to elliptically polarized light.

FIG. 5 shows an exemplary realization of the first embodiment of FIG. 4. It is a 2-channel polarization-coded system with a pair of stereo-isomeric MEMSs according to our superposition method. Light beams emitted by a light source are directed to a first beam splitter (5) which splits the incident light (11) into two spatially separated and linearly polarized beams ("S" and "P" polarization states are indicated by stippled and dashed lines), resulting in two simultaneously modulated channels. It is appreciated that while the drawing shows a perpendicular angle between the channels resulting from the use of a MacNeille type PBS, other angles between the channels are possible if other types of beam splitters and incidence angles are used for beam splitting and/or beam combining (e.g. wire grid polarizers WGP). Both polarized beams are then directed onto two spatial light modulators (1 and 2, SLMs, e.g. DMDs) in two functionally identical modules, which are arranged mirror symmetrically, and which comprise a total internal reflection prism (TIR) each (3) and (4). The SLMs, shown are DMDs, modulate the incident beam (11) by a different mirror deflection in the "ON" versus the "OFF" state of a pixel. "ON" pixel light is reflected in the normal of the DMD surface. Modulated "ON"-beams are recombined in a second beam splitter element (6). In both channels, light paths are arranged such that the plane of incidence ($T1_{POI}$, resp. $T2_{POI}$), which is spanned by incident and reflected beam of the TIR, is parallel to the plane of incidence ($P2_{POI}$), which is spanned by the two incident beams of the PBS (6). A polarization "impurity" (e.g. 5% "P" polarization in the "S" beam), which results in a regular beam splitter, will be substantially removed in the second beam splitter element by the impurities leaving the system in a different direction than the superimposed beam. Thus, a spatial or functional separation of polarization splitter and polarization beam combiner will lead to substantially improved channel separation of the two stereo channels—this reduces "ghosting" (e.g. "P" light in the "S" beam) by a factor of 20 (in the case of MacNeille type PBS), overall channel separation will increase to 400:1. It is appreciated that channel separation, in accordance with our invention, can further be improved by additional cleanup polarizers. FIG. 5A shows a wing-like symmetrical arrangement of the two channels, which is described by our term "stereo wings". As is shown in FIG. 5A, the embodiment can be used with additional dumps to absorb the "OFF"-beams, or, as is shown in FIG. 5B, without dump in the modules. In FIG. 5B downstream of the superposition splitter, a polarization conversion system (25) is attached to the stereo wings (e.g. an achromatic quarter wave plate). In combination with adapted passive stereo goggles for circularly polarized light, the observer may rotate his/her head around the roll axis without influence on channel separation.

FIG. 6 shows the second embodiment of a 2-channel polarization coded system with a pair of stereo-isomeric MEMSs in accordance with our superposition method, which is derived by the folding of the wings in FIG. 5 (folded stereo wings). Both TIRs are rotated by 90°, the folding is accomplished by two deflection mirrors (8), which connect the output of the polarization splitter (5) to the rotated TIRs. The light path in the two channels is directed such that $T_{POI}$ is now perpendicular to $P_{POI}$. The arrangement shown in FIG. 6 may be advantageous when a back focal length (optical length between modulators and projection lens) of minimum size is required. FIG. 6 shows this embodiment of the invention in a top view (FIG. 6B), three side views (FIG. 6A, C, D) and an isometric scheme (FIG. 6E). Beams in the uppermost layers of the views are shown in solid lines, while a dashed line indicates beams in lower planes. Optical axes perpendicular to the drawing plane (paper plane) are indicated by a small circle. In FIG. 6E, the input splitter PBS (5) in the top of the arrangement, the combiner PBS (6) at the bottom of the arrangement, and both TIRs (3 and 4), are indicated as well as the two 90° deflection mirrors (8). FIG. 6B shows a top view (xy-plane) in which the incident light (black filled circle) is obvious. This incident light beam is then split by the input PBS (5) into two differently polarized light beams, which are deflected by the mirrors (8) to the bottom layer. FIG. 6E also shows the superposition PBS (6) in the bottom layer, and superimposed beam (arrow head) leaving the module in the same direction as the input beam enters it. In a side view FIG. 6C shows the light path of channel 1 from the polarizing beam splitter (5) via the 90° mirror (8) in direction of MEMS (1). In another side view FIG. 6D shows the further light path through TIR (3) to MEMS (1) and the "ON"-beam from the modulator to the superposition PBS (6). FIG. 6A shows, in a corresponding side view, the light path of the second channel.

FIG. 7 shows a third embodiment of 2-channel polarization coded system with a pair of stereo-isomeric MEMSs in accordance with our superposition method (stacked stereo wings). This drawing is to be read analogous to FIG. 6. In contrast to the second embodiment, the PBSs for splitting (5) and recombining (6) the light are arranged in a stacked position. It is appreciated that both systems could also be realized by a single larger PBS. Input and output beam are also arranged on top of each other. FIG. 7D and FIG. 7F are isometric 3D drawings from different points of view. FIG. 7B is a top view, and FIGS. 7A, C, E are side views.

FIG. 8 shows a fourth embodiment of a 2-channel polarization coded system with a pair of stereo-isomeric MEMSs in accordance with our superposition method. FIG. 8A shows a top view and FIG. 8b shows a side view of the system. Input light is split by a PBS (7) into orthogonal polarizations. The modulated On light of the MEMSs is recombined by the same PBS (7). Note that input POI and superposition POI are inclined towards each other (due to the IO-characteristics of MEMSs which modulate the light by changing the direction) suggesting PBS (7) to be a wire grid polarizer WGP. FIG. 8B shows the input beam (11) and the on-beam (12) and the off-light which is collected in a dump (15). FIG. 8C shows an isometric view. The input beam (11) is split by the WGP (7) into s- and p-polarized sub beams which are modulated separately by the MEMS (1) and (2). Note that both MEMSs have horizontal MDAs. On-beams are reflected normally to the chip surface and are recombined. Total overlap using the shortest back focal length (one ON-beam is reflected, the other one shows no reflection) is only possible with a pair of stereo-isomeric MEMSs. FIG. 8D shows a different kind of input procedure using a TIR (3) which can reduce back focal length. FIG. 8E uses additional achromatic quarter wave plates in both channels. The orthogonally polarized split-beams pass these quarter wave plates twice. In the first transmission the beams are converted to right-handed and left-handed circular light. With the reflection at the mirrors, this light reverses the handedness of the circular polarization. When traveling back through the quarter wave plates the beams become linearly polarized again but with complementary polarizations to the "IN"-light. The beam which transmitted WGP (7) is now reflected and vice versa. This embodiment allows to direct the superposed "ON"-beams towards a direction different from the input-light. Even without the TIR (3) of FIG. 7D an even shorter back focal length can be achieved.

Figure 9:
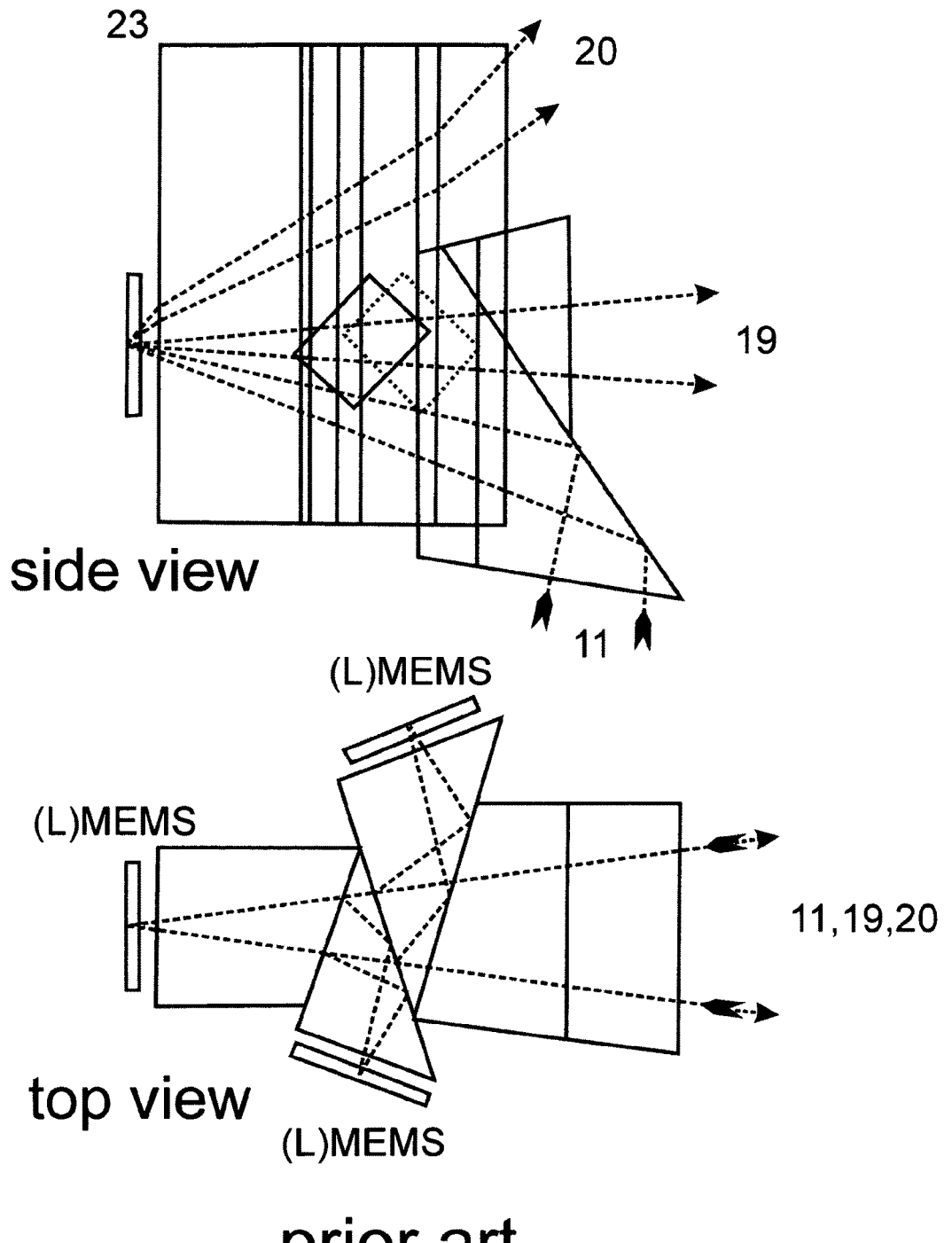
FIG. 9 shows a 3-DMD superposition system according to the state of the art, a trichroic prism assembly (TPA) for 3 chip (L)DMD color management.

FIG. 9 shows a trichroic prism assembly (TPA) as used in the state of the art in 3-channel DMD color displays. A side view (on top) and a top view (bottom) are shown. (Data used from U.S. Pat. No. 7,396,132). The complexity of this assembly is obvious; it results from the additional reflections used in the blue and red channels, where we see two reflections in both the IN and the ON-beam (top view). This necessity inevitably leads to bulky, heavy structures and longer optical path lengths.

FIG. 10 shows a fifth embodiment of a 3-channel color-coded system with a pair of stereo-isomeric MEMSs in accordance with our superposition method and a third MEMS of either handedness. The design corresponds to the 2-channel polarization system of FIG. 8 except that the PBS is replaced by a dichroic color-splitting layer. The second dichroic layer (which in this design crosses the first dichroic layer) is used to realize the principle of FIG. 8 twice. The green-modulating (R)MEMS transmits both dichroic layers while the red- and blue-modulating (L)MEMS are reflected once. Green- and red-modulating DMDs are a pair of stereo-isomers; green- and blue-modulating DMDs are also a pair of stereo-isomeric MEMSs. The superposition method of our invention is used twice in this arrangement. The advantages of this compact system become obvious when compared to the TPA design as shown in FIG. 9. Obviously, the green-modulating DMD could also be chosen to be of the (R)-topology, when its partners are chosen to be (L) topologies.

Figure 11A:
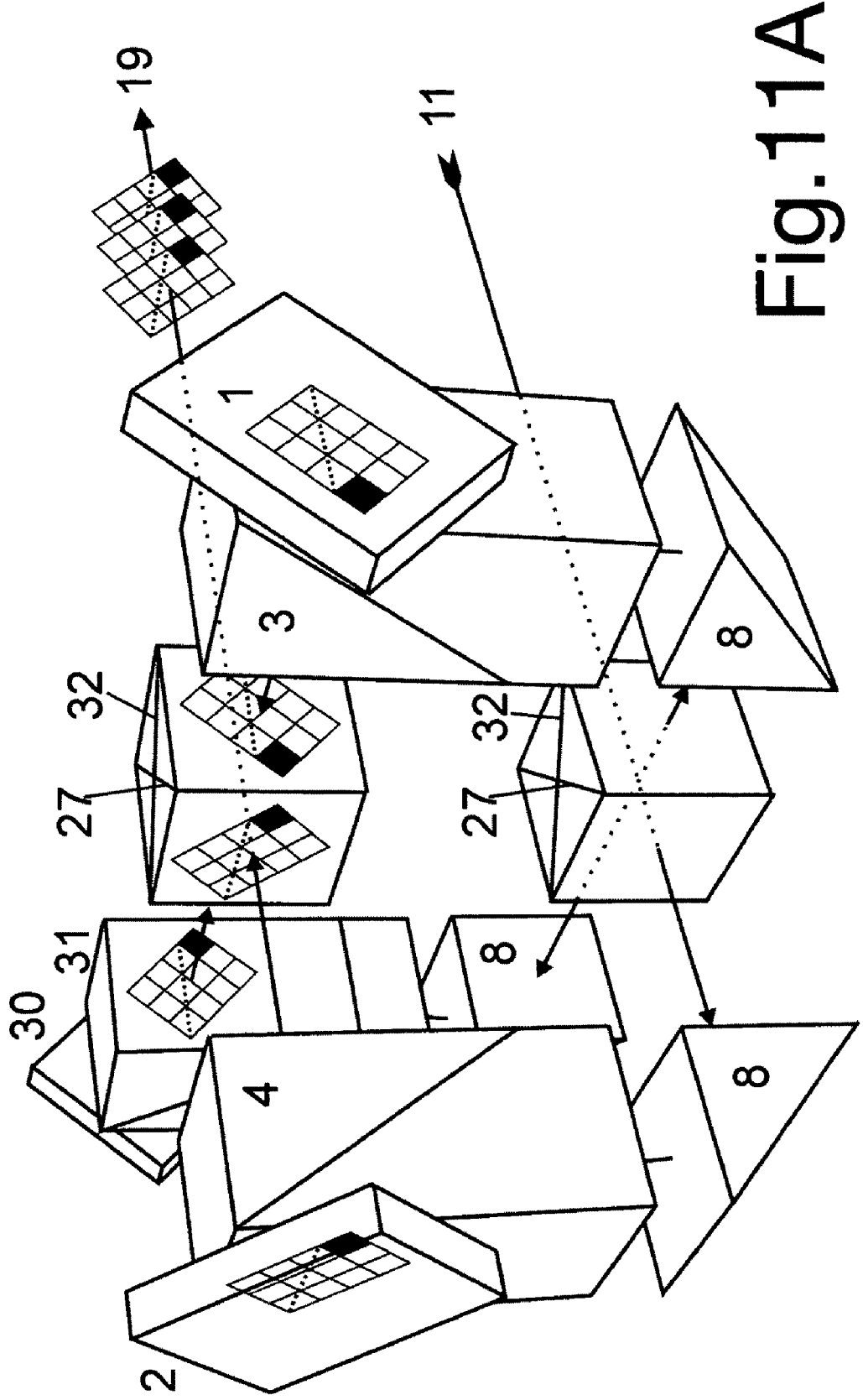
FIG. 11A shows a 3-DMD superposition system according to our method.
Figure 11B:
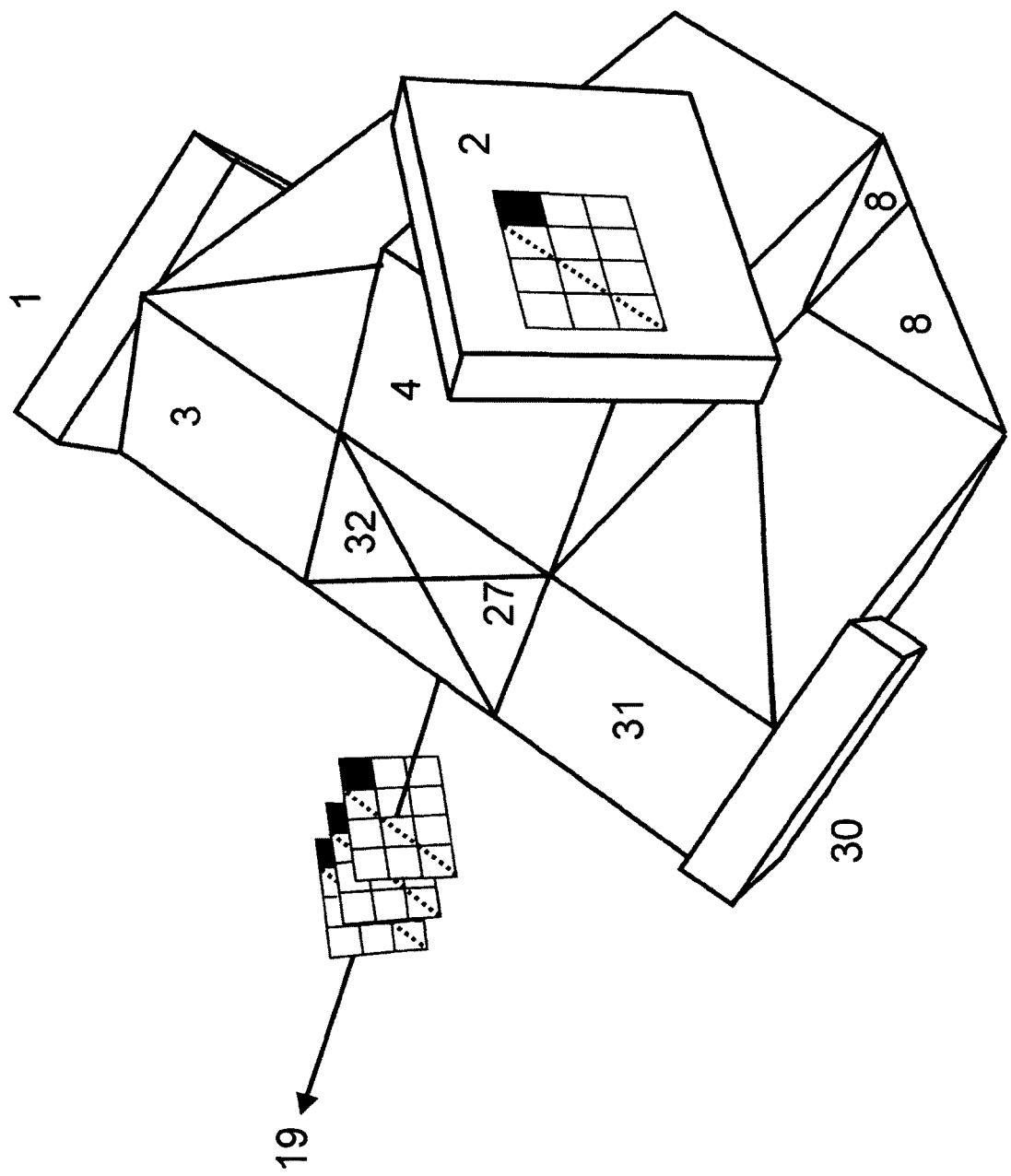
FIG. 11B shows a 3-DMD superposition system according to our method.

FIGS. 11 A, B show a sixth embodiment of a 3-channel color-coded system with a pair of stereo-isomeric MEMSs in accordance with our superposition method and a third MEMS of either handedness in an open (11A) and closed view (11B). The design is again similar to the designs shown in FIG. 4 and especially that of FIG. 7. However, there are 3 channels, accordingly three TIRs (3) are used and the PBS is replaced by a dichroic color-splitting layer. The second dichroic layer (which in this design crosses the first dichroic layer) is used to realize the principle of FIG. 7 twice. The green-modulating (R)MEMS transmits both dichroic layers and the red- and blue-modulating (L)MEMS are reflected once. Green- and red-modulating DMD are a pair of stereo-isomers and greenand blue-modulating DMD are also a pair of stereo-isomeric MEMSs. The superposition method of our invention is used twice in this arrangement. The advantages of this compact system become obvious when compared to the TPA. FIG. 11B shows the compact design rotated by 45 degrees to have the image raster oriented horizontally.

FIG. 12 shows a seventh embodiment of a 6-channel color- and polarization-coded system with several pairs of stereo-isomeric MEMSs in accordance with our superposition method. The design uses the 3-channel system of FIG. 11 twice and combines them with a cross-polarizer as described by Mayer and Bausenwein (U.S. application 2007/0,159, 693).

It will be appreciated that whilst this invention is described by way of detailed embodiments, these realizations serve as illustrations of the invention but not as a limitation of the invention; numerous variations in form and detail can be deduced by those skilled in the art or science to which the invention pertains without leaving the scope of the invention as defined by the following claims:

The invention claimed is:

1. Superposition Method Using a Pair of Stereo-isomeric MEMSs comprising the steps of
    using two MEMSs which have stereo-isomeric topology with regard to mirror deflection axis and image raster, and both stereo-isomeric topologies, the left-handed and the right-handed type being used;
    using at least one light source as light providing system to feed the two MEMSs;
    said light providing system comprising at least three spectral components, which are sufficient to span a color space;
    using a superposition layer configured to superpose the light of one ON-beam transmitting said layer and the light of the second ON-beam which is reflected by said layer into a common ON-beam.

2. Superposition Method Using a Pair of Stereo-isomeric MEMSs according to claim 1,
    arranging the superposition such that the number of reflections of one ON-beam differs from the number of reflections in the second ON-beam by an odd number.

3. Superposition Method Using a Pair of Stereo-isomeric MEMSs according to claim 2,
    said odd number being 1.

4. Superposition Method Using a Pair of Stereo-isomeric MEMSs according to claim 1,
    using a polarizing beam splitting layer as superposition layer.

5. Superposition Method Using a Pair of Stereo-isomeric MEMSs according to claim 1,
    using a color-splitting layer as superposition layer.

6. Superposition Method Using a Pair of Stereo-isomeric MEMSs according to claim 1,
    using a third stereo-isomeric MEMS of either the left-handed or right-handed type;
    feeding said third MEMS by said light providing system;
    superposing said third ON-beam to the ON-beams of the first and second MEMSs by a second superposition layer.

7. Superposition Method Using a Pair of Stereo-isomeric MEMSs according to claim 6,
    using said first and second superposition layers also as splitting layers in the light providing system.

8. Superposition Method Using a Pair of Stereo-isomeric MEMSs according to claim 1,
    using said superposition layer also as splitting layer in the light providing system.

9. Superposition Method Using a Pair of Stereo-isomeric MEMSs according to claim 1,
    using a total internal reflection prism (TIR) to feed said MEMSs.

10. Superposition Method Using a Pair of Stereo-isomeric MEMSs according to claim 1,
    using two total internal reflection prisms (TIRs) to feed said MEMSs.

11. Superposition Method Using a Pair of Stereo-isomeric MEMSs according to claim 6,
    using three total internal reflection prisms (TIRs) to feed said MEMSs.

12. Superposition Method Using a Pair of Stereo-isomeric MEMSs according to claim 1,
    guiding said common ON-beam through a projection lens.

13. Superposition Method Using a Pair of Stereo-isomeric MEMSs according to claim 1,
    using 2 quarter wave-plates.

14. Superposition Method Using a Pair of Stereo-isomeric MEMSs according to claim 1,
    using a first DMD with a modulator array of b columns and m rows as said left-handed type, and a second DMD with a modulator array of m columns and b rows as said right-handed type.

* * * * *